United States Patent [19]

Auracher et al.

[11] Patent Number: 4,505,539
[45] Date of Patent: Mar. 19, 1985

[54] OPTICAL DEVICE OR SWITCH FOR CONTROLLING RADIATION CONDUCTED IN AN OPTICAL WAVEGUIDE

[75] Inventors: Franz Auracher, Baierbrunn; Hermann Buerk, Maisach; Rudolf Keil; Michael Stockmann, both of Munich; Kaspar Weingand, Duernbach; Karl-Heinz Zeitler, Munich, all of Fed. Rep. of Germany

[73] Assignee: Siemens Aktiengesellschaft, Berlin & Munich, Fed. Rep. of Germany

[21] Appl. No.: 415,708

[22] Filed: Sep. 7, 1982

[30] Foreign Application Priority Data

Sep. 30, 1981 [DE] Fed. Rep. of Germany ....... 3138968

[51] Int. Cl.$^3$ ................................................. G02B 5/14
[52] U.S. Cl. .............................. 350/96.15; 200/81 R; 350/96.20
[58] Field of Search ................ 350/96.15, 96.20; 200/81 R, 81.6, 81.9 R, 81.9 AG, DIG. 36, DIG. 31

[56] References Cited

U.S. PATENT DOCUMENTS

| | | | |
|---|---|---|---|
| 3,906,415 | 9/1975 | Baker | 335/51 X |
| 4,121,884 | 10/1978 | Greenwood | 350/96.29 X |
| 4,245,886 | 1/1981 | Kolodzey et al. | 350/96.20 |
| 4,364,639 | 12/1982 | Sinclair et al. | 350/96.15 X |
| 4,384,761 | 5/1983 | Brady et al. | 350/96.20 |

FOREIGN PATENT DOCUMENTS

| | | | |
|---|---|---|---|
| 0033128 | 3/1980 | Japan | 350/96.20 |
| 0107202 | 8/1981 | Japan | 350/96.20 |
| 2026188 | 1/1980 | United Kingdom | 350/96.20 |

OTHER PUBLICATIONS

"Bypass Switch Optical Fiber Ring Network" F. Gfeller, IBM Technical Disclosure Bulletin, vol. 24, No. 3, Aug. 1981.

*Primary Examiner*—William L. Sikes
*Assistant Examiner*—Akm E. Ullah
*Attorney, Agent, or Firm*—Hill, Van Santen, Steadman & Simpson

[57] ABSTRACT

An optical device, such as the switch, for controlling the passage of a light beam into and out of an end face of a waveguide such as a glass fiber includes utilizing either a layer or drop of liquid material to control the light passage. The liquid material can be a layer, which has changeable optical properties, which can occur by applying a magnetic field, heat or electrical field or the material can be a layer of electrolyte material which will precipitate a reflective layer or electrochromic layer in response to an application of an electrical field. In another embodiment, the liquid material may be moved into and out of engagement with the end face to change the reflective nature of the end face and to cause decoupling of light from the end face or block the transmission of light.

19 Claims, 23 Drawing Figures

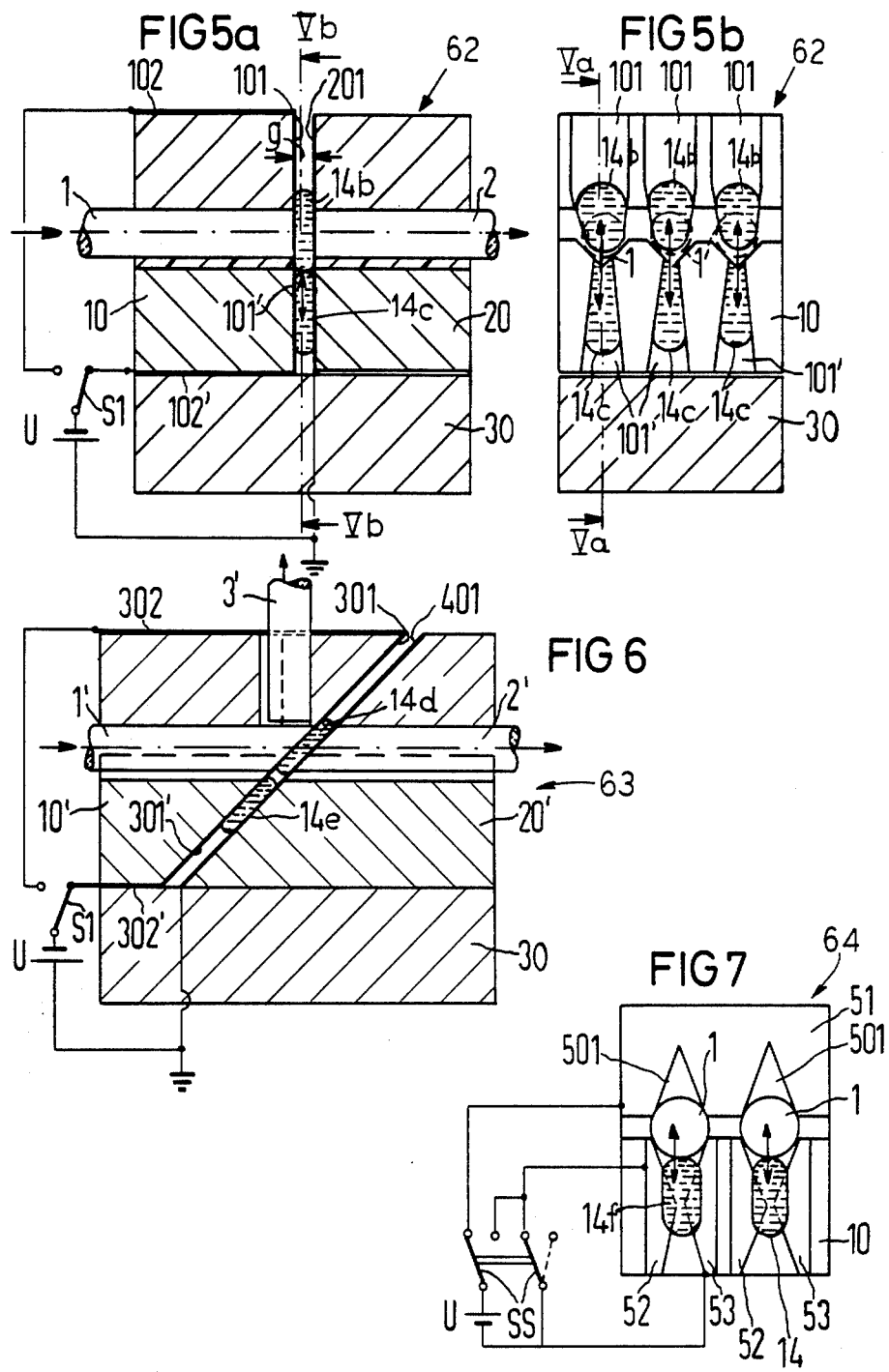

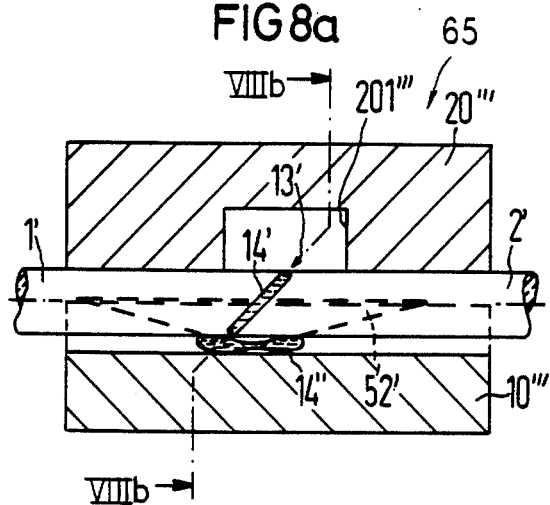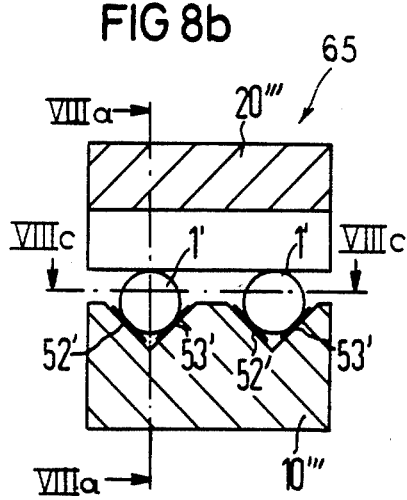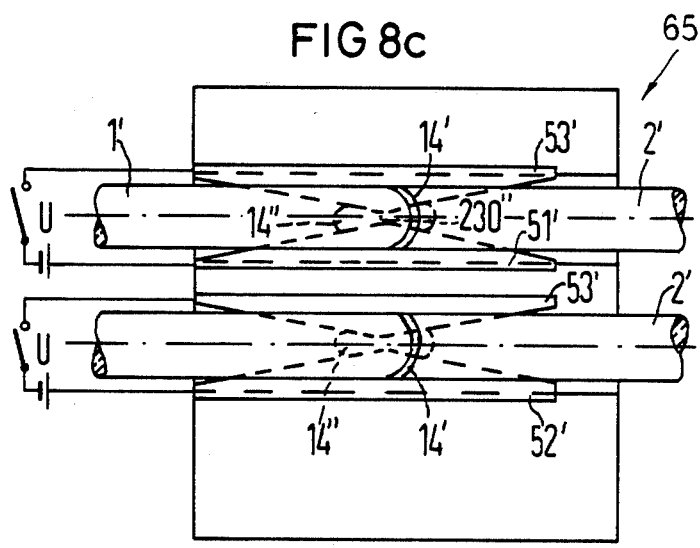

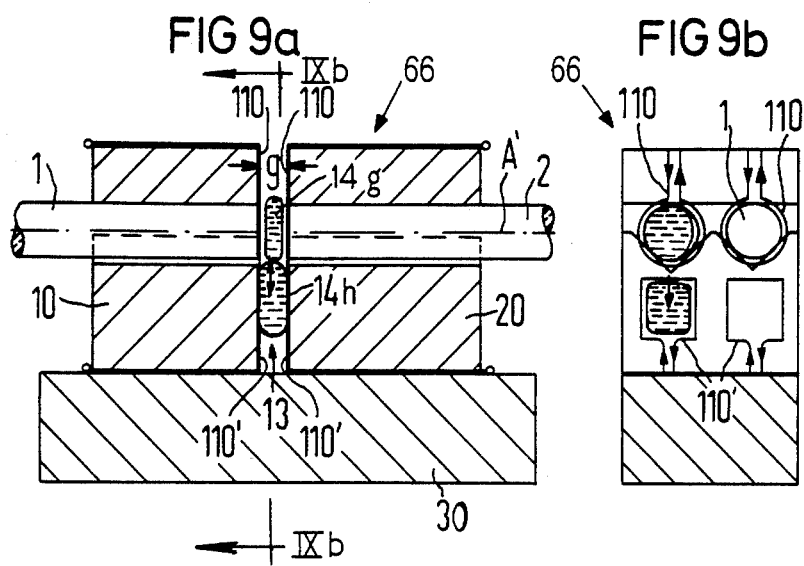

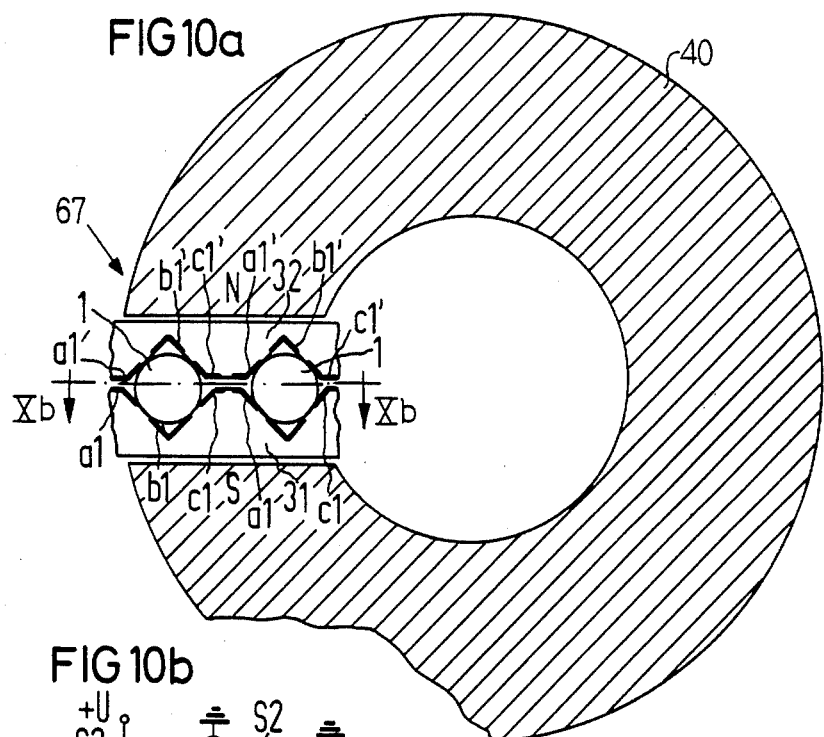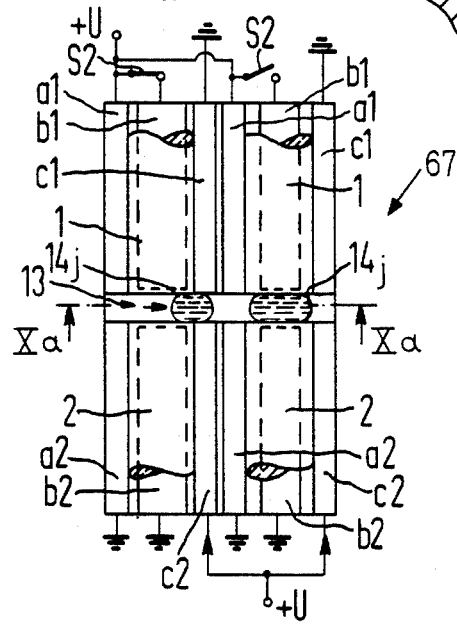

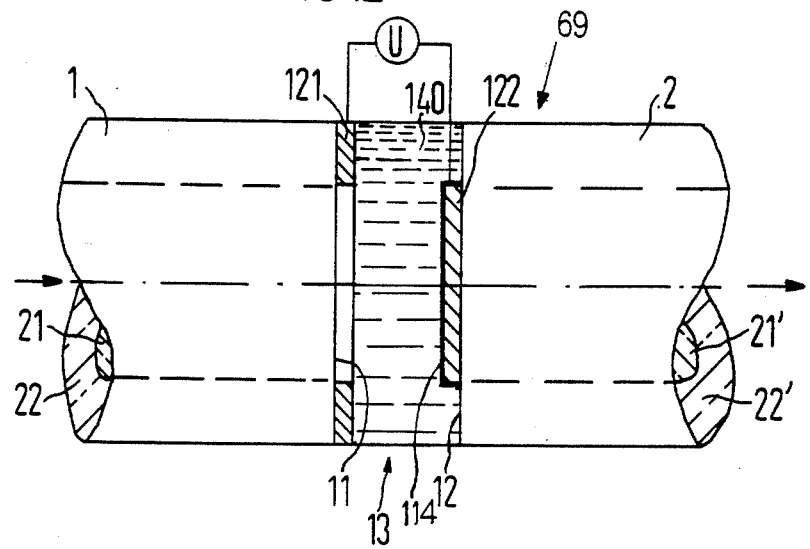
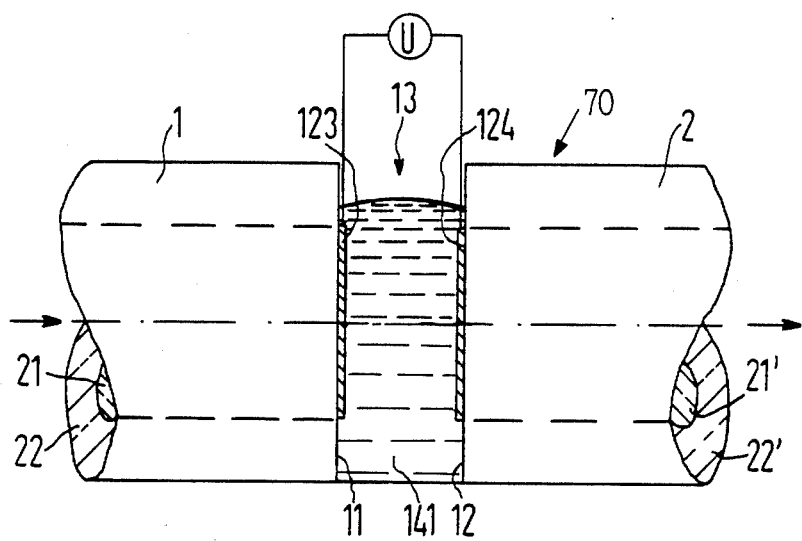

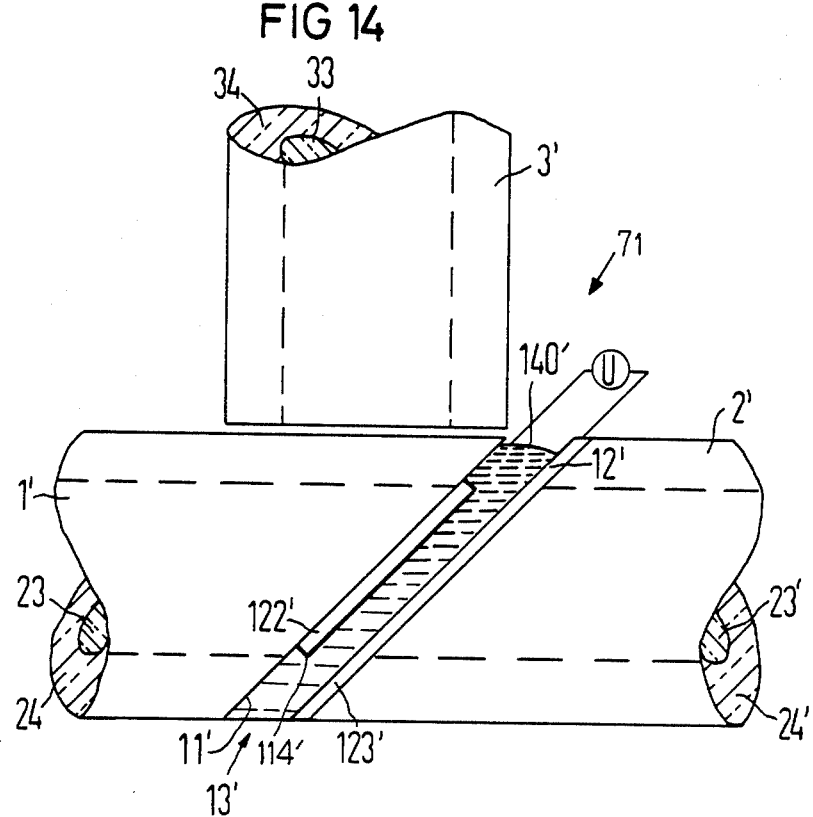

OPTICAL DEVICE OR SWITCH FOR CONTROLLING RADIATION CONDUCTED IN AN OPTICAL WAVEGUIDE

BACKGROUND OF THE INVENTION

The present invention is directed to an optical device for controlling the radiation conducted in an optical waveguide and is particularly directed to an optical switch.

Multifiber switches are of great interest in optical communication technology which uses glass fibers. Up to now primarily mechanical fiber switches have been utilized. In these switches, the fiber at the input side is bent and therefore brought into optical contact with one of two output fibers. The manufacture of these switches is relatively involved and cannot be simply integrated into a switch row. Moreover, the mechanical stresses on the fibers is undesirable.

SUMMARY OF THE INVENTION

The present invention is directed to providing an optical device such as an optical switch in which mechanical stresses on the waveguides are avoided and which switch or device can be easily manufactured in a planar technology. To accomplish this object, an optical device for controlling radiation conducted in an optical waveguide comprises an optical waveguide having an end surface and means for controlling the entrance and exit of a beam of radiation from said end surface of the waveguide, said means including a liquid medium being disposed adjacent said end surface. If the optical device is a switch, it will include at least a first and second optical waveguide, such as a fiber, having end surfaces, means for supporting the waveguides in alignment with a gap between the end surfaces, and means disposed at said gap for controlling transmission of light between said end surfaces, said means for controlling including a liquid medium being disposed adjacent said gap.

The liquid medium is advantageously a liquid which can be moved by means of mechanical, electrical or magnetic forces into and out of contact with the end surfaces of fibers to effect the optical transmission therefrom. The liquid may have properties which will effect transmission of the beam of radiation such as being either a light-transmissive liquid having a refractive index which is matched to the refractive index of the end surface of the waveguide, a light-scattering and light-absorbing liquid, or an impermeable or reflective liquid. When the liquid is light-scattering and light-absorbing, this can be due to particles which are suspended in the liquid and may be magnetizable. The liquid may be made up of two separate non-mixing materials, one of which has a light-transmissive property and the other a light-blocking property so that movement of a liquid boundary of the two liquids from a position with the end surface engaging one of the liquids to a position engaging the other liquid controls the passage of light from the surface. The liquid may also be an electrolyte which when an electrical field is applied will either electrochemically precipitate a layer which can then be dissolved by reversing the current or electrochemically produce an electrochromic colored layer which can be removed by reversing the current. The liquid medium may also be a material whose optical transmission behavior is changed electrically, mechanically or thermally. These last three provide possibilities of a quick control and particularly a reversible control which is very desirable for switches.

A significant part of the invention is therefore directed to structural design of the switches where a plurality of different switching principles are applied. Since in these switches a mechanical bending of the waveguides such as the optical fibers is no longer required, the useful life of the switches is significantly increased in comparison to the above-mentioned mechanical fiber switches. A very significant advantage also lies in the fact that the switches can be manufactured utilizing planar technology so that a large number of individual switches can be simultaneously manufactured in a switch row without significant additional cost.

BRIEF DESCRIPTION OF THE DRAWINGS

FIGS. 5a and 5b are cross-sectional views of an electrostatically switched embodiment of an on-off switch similar to the switch of FIGS. 1 and 2, wherein FIG. 5a is taken on a line Va—Va in FIG. 5b, FIG. 5b is a cross-sectional view taken along the line Vb—Vb in FIG. 5a;

FIG. 6 is a cross-sectional view of another embodiment of a changeover switch similar to the switch of FIGS. 3 and 4;

FIG. 7 is a cross-sectional view of another embodiment of an on-off switch similar to the switch of FIGS. 1 and 2 and taken in a position similar to that of FIG. 5b;

FIGS. 8a, 8b and 8c are views of another embodiment of an on-off switch in accordance with the present invention wherein FIG. 8a is a cross-sectional view taken along the lines VIIIa—VIIIa of FIG. 8b; FIG. 8b is a cross-sectional view taken along the lines VIIIb—VIIIb of FIG. 8a and FIG. 8c is a view taken along the lines VIIIc—VIIIc of FIG. 8b with portions in elevation for purposes of illustration;

FIG. 9a is a longitudinal cross-sectional view of another embodiment of an on-off switch in accordance with the present invention;

FIG. 9b is a cross-sectional view taken along the lines IXb—IXb of FIG. 9a;

FIGS. 10a and 10b are views of a magnetically actuated embodiment of an on-off switch according to the present invention wherein FIG. 10a is a view taken along the lines Xa—Xa of FIG. 10b and FIG. 10b is a cross-sectional view with portions in elevation for purposes of illustration taken along the lines Xb—Xb of FIG. 10a;

FIGS. 11a, 11b and 11c are views of another embodiment of a magnetically switched on-off switch according to the present invention wherein FIG. 11a is taken on a line such as XIa—XIa of FIG. 11c; FIG. 11b is taken on lines XIb—XIb of FIG. 11a with portions in elevation for purposes of illustration and FIG. 11c is a side view of the aligned fibers of FIG. 11b with portions removed for purposes of illustration;

FIG. 12 is a longitudinal cross-sectional view with portions in elevation for purposes of illustration of another embodiment of an on-off switch in accordance with the present invention;

FIG. 13 is a longitudinal cross-sectional view with portions in elevation for purposes of illustration of yet another embodiment of an on-off switch in accordance with the present invention;

FIG. 14 is a cross-sectional view with portions in elevation for purposes of illustration of a still further embodiment of a changeover switch in accordance with the present invention;

DESCRIPTION OF THE PREFERRED EMBODIMENTS

Figure 1:
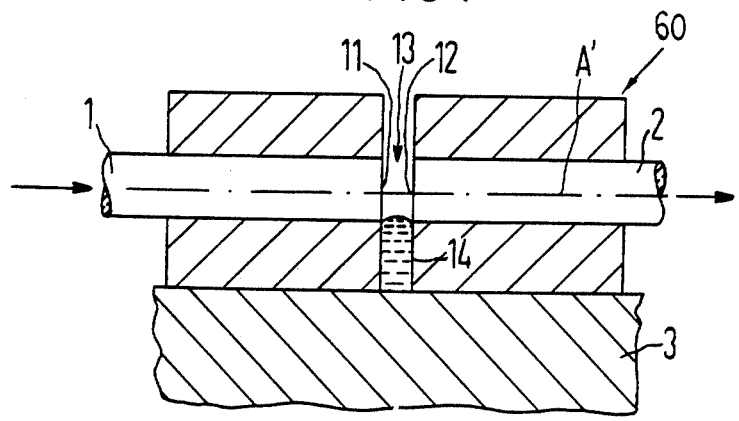
FIG. 1 is a longitudinal cross-section of an on-off switch in an "on" condition according to the present invention.
Figure 2:
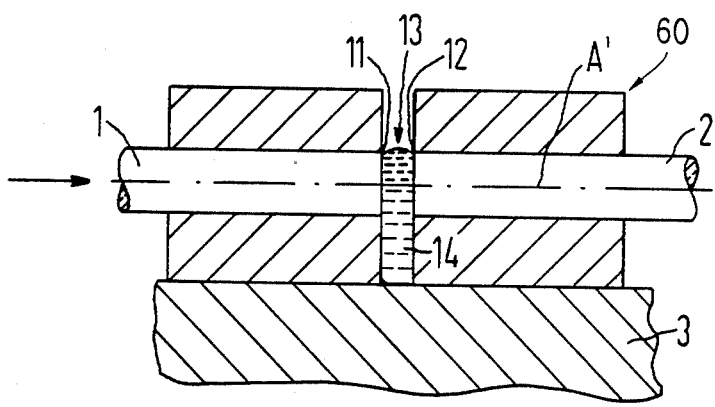
FIG. 2 is a longitudinal cross-section of the switch of FIG. 1 in an "off" condition or state.

The principles of the present invention are particularly useful in an on-off switch generally indicated at 60 in FIGS. 1 and 2. The on-off switch 60 includes a pair of waveguides such as glass fibers 1 and 2, which have polished end surfaces 11 and 12. The waveguides are positioned in a guidance groove for a carrier body 3 so they are axially aligned along axis A' with a gap 13 between the end surfaces 11 and 12. The gap 13 will be approximately 10 through 100 μm in width. As illustrated, the end surfaces 11 and 12 extend perpendicularly to the axis A' and thus the gap also is perpendicular relative to the common fiber axis. The guidance grooves which receive and align the fibers 1 and 2 can be manufactured, for example, by a planar technique such as by privilege etching or anisotropic etching in silicon.

The switch 60 also includes means for controlling the transmission of light from the end face 11 to the end face 12 of the fibers 1 and 2 which means is illustrated as a liquid material or medium 14, which is greatly light-absorbing as possible and which can be selectively introduced into the coupling gap 13 between the fibers 1 and 2 and can also be removed therefrom. As illustrated in FIG. 1, the level of the liquid 14 is not high enough to extend between the two end surfaces 11 and 12 and thus the switch 60 is in the "on" condition with the light being emitted from the fiber 1 being transmitted through the gap 13 to the fiber 2. However, by increasing the level of the liquid in the gap to a position illustrated in FIG. 2 with the liquid covering the two end faces 11 and 12, the light impermeable liquid 14 will prevent or block passage of light from the fiber 1 to the fiber 2 and thus the switch is in an "off" state or condition.

Figure 3:
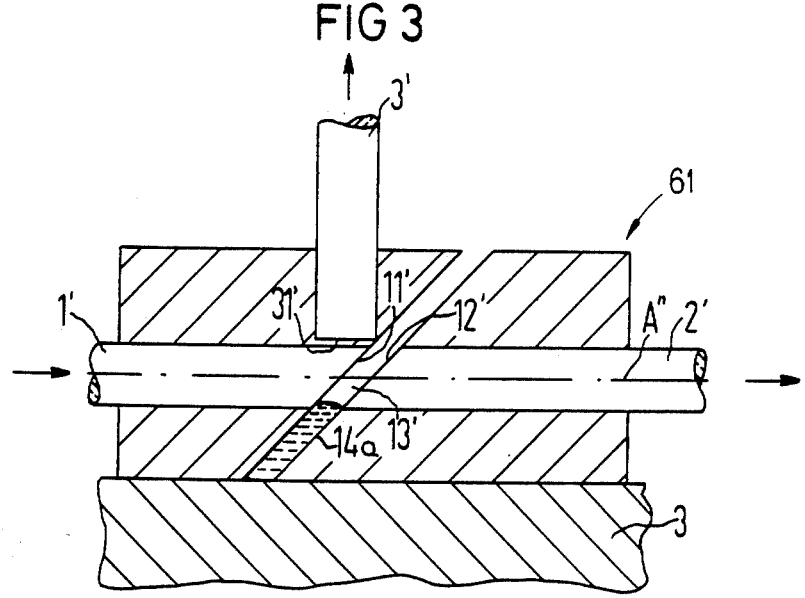
FIG. 3 is a longitudinal cross-section of a changeover switch in a state for switching light to a branching fiber in accordance with the present invention.
Figure 4:
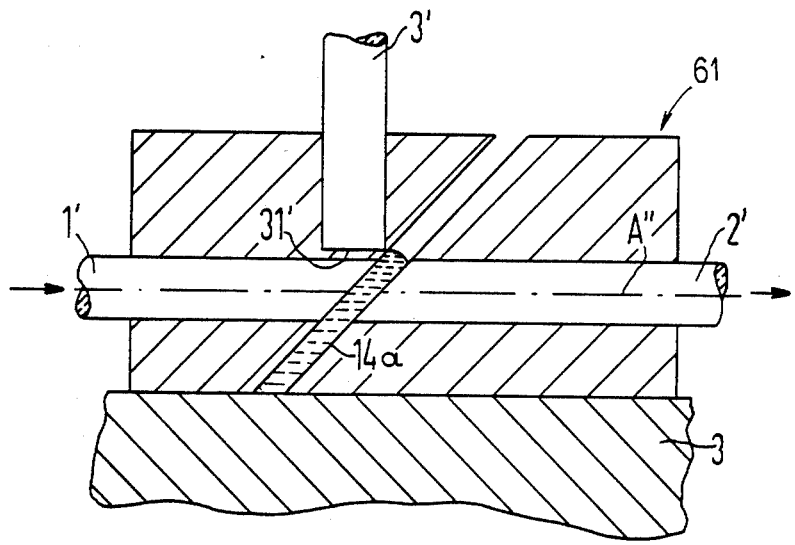
FIG. 4 is a longitudinal cross-section of the switch of FIG. 3 in a state for not switching light to the branch fiber.

An embodiment of a switch under the principles of the present invention is illustrated as a changeover switch in FIGS. 3 and 4 and is generally indicated at 61. The changeover switch 61 also includes two coaxial fibers 1' and 2', which are inserted in a guidance groove in a carrier body 3. The fibers 1' and 2' have end surfaces 11' and 12' which are spaced apart by a gap 13' by the aligning mechanism with the gap having a width of 10 through 100 μm. However, a different feature of the switch 61 from the switch 60 is that the end surfaces 11' and 12' which define the coupling gap 13' are inclined at an angle of 45° and thus obliquely to the common fiber axis A''. In addition, the switch 61 includes a third or additional glass fiber 3', which extends perpendicularly to the axis A'' and has an end face 31' which is positioned above the fiber 1' adjacent the surface 11' of the gap 13'. Thus, any light reflected at the end surface 11' of the first fiber 1' will be received by the end surface 31' of the fiber 3'. The switch 61 includes an immersion liquid 14a which is disposed in the gap 13' between the end faces 11' and 12'. This immersion liquid is as transparent as possible and has an index of refraction of the waveguides 1' and 2'. In the switching state illustrated in FIG. 3, the immersion liquid 14a in the gap 13' is not between the end surface 11' and 12. Thus, an optical connection will exist between the fiber 1' and the fiber 3' which is due to the fact that the end surface 11' will reflect the light in the direction of 3' due to discontinuity of the index of refraction at the glass and air boundary at the surface 11'. Thus, the switch state illustrated in FIG. 3 is a coupling-over state to the branch fiber 3'.

In a switching state according to FIG. 4 which is a coupling of a light from the fiber 1' to the fiber 2' which is a straight-through coupling state, the immersion liquid 14a is introduced into the gap 13' between the end surfaces 11' and 12'. Thus, because of the index of refraction of the liquid in the gap 13' is now approximately equal to the index of refraction of the two fibers 1' and 2', the total reflection at the end surface 11' no longer exists and thus the light is coupled from the end surface of the fiber 1' to the fiber 2'.

In the embodiments of the switches 60 and 61, the liquid must be introduced into the coupling gap or in turn be removed therefrom. However, it is also possible to use two liquids which do not mix and which exhibit different optical properties, for example, different indices of refraction and/or different amounts of absorption. To that end, a combination of mercury and sulfuric acid can be advantageously employed. The boundary surface of the mercury and sulfuric acid in the coupling gap can be shifted by means of applying a voltage so that in one condition the mercury is disposed between the end faces of the fibers and in the other switching state the sulfuric acid is disposed between the end faces. It is also possible to utilize a liquid which has suspended therein particles that are greatly absorbent or scattering. Examples of these particles are small magnetizable particles which can be moved in a controllable magnetic field.

Embodiments in which the gap between the fibers constantly remains filled with a liquid are advantageous. An advantage of these embodiments is that no contaminants can dry on an end surface of a fiber and the capillary forces which are often very large need not be overcome during switching.

The liquid can be displaced in the coupling gap by means of either electrical, magnetic or mechanical forces. The employment of an electrically conductive liquid on which a force can be exerted by means of a current flux and a magnetic field or by means of changing the surface tension with an excited electrical voltage are particularly expedient. This is the case, for example, with the combination of mercury and sulfuric acid. In addition, however, a movement of a liquid drop as a result of a pressure force or because of thermal expansion is also possible. Since the volume of liquid can be kept very small, reasonable switching times are also possible. An embodiment of an on-off switch with a plurality of on-off switches similar to the switches 60 of FIGS. 1 and 2 on a common carrier is generally indicated at 62 in FIGS. 5a and 5b. In this embodiment, the liquid of each switch is moved by means of an electrostatic force.

The switch 62 can be manufactured, for example, in such a manner that the glass fibers are inserted in parallel guidance grooves in a surface of a substrate, for example, a silicon lamina with grooves manufactured by means of anisotropic etching. The fibers in the grooves are then covered with a cover body and the substrate and cover are bonded together utilizing an adhesive or glue which preferably completely fills up the spacing between the cover body, the substrate and fibers. The block with the parallel fibers, which has been created in this manner, is then cut perpendicular to the fiber axis so that two block parts 10 and 20 are provided with the block part 10 having the fibers 1 and the block part 20 having the fibers 2. The cut surfaces of the block parts 10 and 20 are then upgraded to an optical quality at least in the area of the fibers such as by polishing. An electrode 201 is then applied on the working surface such as the block 20 to cover the fibers 2. The electrode 201 can be an electrode which is shared in common by all of the fibers and will cover the entire surface of both the fibers 2 and the block 20 and is light-transmissive or transparent. The block part 10 on the surface having the end faces of the fibers 1 is provided with a pair of electrodes for each fiber with each pair consisting of an upper electrode 101 having a conductor 102 and a lower electrode 101' with a conductor 102'. After providing the electrodes and the conductor strips, the two block parts 10 and 20 are secured on a carrier body 30 in such a manner that the fibers 1 and 2 of both block parts are aligned with a narrow gap 13 of a width g between the parting surfaces provided with the transparent electrodes.

A respective pair of liquid drops 14b and 14c are introduced into the gap 13 between the blocks 10 and 20 for each pair of fibers 1 and 2. The pair of liquid drops will consist of two liquids of different dielectrics of which one is transparent and the other is opaque. For the purpose of vertical displacement of each pair of drops 14b and 14c, a voltage U is applied between upper electrode 101 or the lower electrode 101' of the particular electrode pair on the block part 10 and the electrode 201 on the block part 20. When the voltage U is applied between the upper electrode 101 and the electrode 201, the pair of liquid drops are vertically shifted in one direction. When in the contrast thereto, the voltage is applied between the lower electrode 101' and electrode 201, the pair of liquid drops 14b and 14c will be shifted vertical in the opposite direction. By so doing, a transparent drop or an opaque drop can be selectively brought between the allocated aligned fibers 1 and 2.

In the embodiment 62 according to FIGS. 5a and 5b, the electrode 201 on the block part 20 is, for example, grounded, and the voltage U can be selectively connected by means of an electrical changeover switch or means S1 to either the electrical strip connector 102' to the lower electrode 101' or illustrated or to the electrical strip conductor 102 for the upper electrode 101.

A significant feature of the embodiment of the switch 62, which has a liquid drop being shifted in the gap by means of electrostatic force, is that the electrical field is generated in some manner or other in the gap. In the embodiment of the switch 62, this electrical field is generated by means of applying a voltage to spaced electrodes which function as a capacitor. If the electrodes are designed in such a manner that a homogeneous field is generated, then the field strength E of the field is given by $E = U/g$, wherein U denotes the voltage applied to the electrodes and g is the space or gap between the electrodes, i.e., the gap width. The force F per surface unit A exerted on the liquid drops is then given by the formula $F/A = \frac{1}{2}\epsilon_o(\epsilon_v - 1) U^2/g^2$ wherein $\epsilon_o$ is the dielectrical constant of a vacuum and $\epsilon_v$ is the relative dielectrical constant of the liquid.

A changeover element or switch 63, which includes a plurality of individual changeover switches according to or similar to the switches 61 of FIGS. 3 and 4 that are disposed on a common carrier body 30 is illustrated in FIG. 6. The embodiment 63 is constructed in a manner similar to the switch 62 and the liquid medium of the switch 63 is also moved by means of electrostatic forces.

While the embodiment of the switch 63 can be manufactured in a manner similar to the embodiment of the switch 62 of FIGS. 5a and 5b, the cover body with the parallel extending fibers 3' is used and is located on the glass fibers 1' and 2' which are lying in the parallel guidance grooves of the substrate so that the fibers 3' of the cover body are disposed over the respective fibers of the substrate and extends perpendicularly thereto. The cover body can be manufactured in the same manner that the block of parallel fibers mentioned with regard to construction of the switch 62 is manufactured. The side of the block which contains the fiber ends forming the fibers 3' is expediently ground and polished or is upgraded to an optical quality in some other manner at least in the area of the ends of the fibers.

After the block which forms the cover and contains the branch fibers 3' is placed on the fibers in the groove of the substrate in the proper alignment, it is bonded to the substrate to create a block which is substantially the same as the block of the switch 62 and this block will have both the parallel extending fibers and the branched fibers extend perpendicular thereto. This block is then cut on a plane that extends at an angle 45° relative to the axis of the fibers in the groove of the substrate which plane is adjacent or in the proximity of the fibers 3' so that two block parts 10' and 20' are formed. As illustrated, the block part 10' will contain the fibers 1' and the branching fibers 3' while the block part 20' will contain the fibers 2'. The cut surfaces of each of these blocks 10' and 20' are then brought up to optical quality at least at the fiber end surfaces. As in the embodiment forming the switch 62, an electrode 401 is applied on the cut surface of the block 20' while electrode pairs for each of the fibers, which pair consist of an upper electrode 301 and a lower electrode 301', are applied on the cut surface. These electrodes may be applied by means of vapor-deposition of a metal and if necessary metal strips such as 302 and 302' which act as electrical lines for each of the electrodes 301 and 301', respectively, are also applied on the block parts 10'.

The block parts 10' and 20' are now secured on the carrier body 30' in such a manner that the fibers 1' and 2' in the two block parts are aligned and a narrow gap remains between the parting surfaces which have the electrodes lying opposite one another. In this gap, a pair of liquid drops 14d and 14e are introduced for each pair of fibers 1' and 2' with one of the two drops 14d and 14e being an opaque and electrically non-conductive drop and the other drop being a transparent electrically non-conductive drop. By means of applying a voltage between an upper electrode 301 and the electrode 401 or between the lower electrode 301' and the electrode 401 the opaque drop or the transparent drop can be selectively brought between the two aligned fibers 1' and 2'. To that end, the electrode 401 is again preferably grounded and a voltage U is applied by a changeover means S1' to the line 302 for the upper electrode 301 or to the line 302' for the lower electrode 301'. As in previous embodiments, when a transparent drop is between the end faces, light will be transmitted from the fiber 1' to the fiber 2' while when the opaque drop is between the end faces, light will be reflected into the branch 3'.

Another embodiment of an on-off switch is generally indicated at 64 in FIG. 7. The switch 64 is similar in construction to the switch 62 except for a different type of electrode structure. In addition, only a single drop 14f is provided between in the gap per fiber pair. Another distinction of the switch 64 over the switch 62 is that the electrodes are only applied on one side or surface of the gap. The electrodes are shaped and wired in such a manner that an inhomogeneous electrostatic field arises and has an area with the highest field strength to which the liquid drop will be drawn.

In the embodiment of the switch 64, the electrodes specifically consist of an upper electrode 51 which is disposed above the fibers 1 and of a lower pair of electrodes 52 and 53 which are disposed laterally next to one another beneath each fiber 1. The upper electrode 51 is illustrated as a common electrode for both fibers, and exhibits a specifically triangular-shaped recess or cutout 501 for each fiber 1 and this recess tapers so that the tip of the triangle is disposed above its adjacent fiber. The mutually separated electrodes 52 and 53 of each pair of electrode are designed in such a manner that they taper toward one another so that the spacing between the electrodes decreases or narrows to a point on each electrode which is closest to the adjacent electrode of the pair with the points being disposed below each of the fibers 1.

The electrodes 51, 52 and 53 are wired to one another in such a manner that the voltage U can be optionally applied between the upper electrode 51 and the pair of electrodes formed by the electrodes 52 and 53 or between the two electrodes 52 and 53 of each electrode pair itself. The changeover can occur, for example, by using a double switch SS which consists of two individual switches coupled to one another. In each of the two instances, an inhomogeneous electrostatic field is generated between the electrodes. In one instance, the area of the highest field strength exists above the fiber 1 and in the other instance it exists below the fiber. The liquid drop 14f, which is in the gap adjacent the fiber 1 will be attracted to the area of the greatest field strength and thus is optionally moved up or down. It is also possible that a second drop can be used with the drop 14f.

In the embodiments of the switches 62, 63 and 64, the displacement of the liquid drop or drops is achieved by means of a switching voltage to different electrodes. In contrast thereto, an embodiment of the switch generally indicated at 65 in FIGS. 8a, 8b and 8c utilizes the electrostatic force as well as capillary forces that exist in the gap. In the switch 65, a carrier body 10''' is provided with a V-shaped groove for each of the fibers 1' and 2'. A pair of electrodes 52' and 53' (FIG. 8c) are disposed in each V-shaped guidance groove by being applied on the two side walls of the groove. Each of the electrodes has a triangular configuration extending toward each other at the base of the groove so that a point 230'' of the nearest spacing between electrodes is adjacent the base of the groove. Each of the fibers 1' and 2' are disposed in the groove with a gap such as 13' being positioned adjacent to the point 230'' of closest spacing of the electrode pairs. A cover body 20''' which has a cavity 201''' covers this arrangement. As illustrated, the coupling gap 13' preferably is inclined at an angle of 45° relative to the fiber axis and starts adjacent the point 230'' of the narrow spacing. By means of applying an electrical voltage U between the electrodes 52' and 53' of an electrode pair, an inhomogeneous electrostatic field is generated whose area of greatest field strength will lie at the point 230'' of narrowest spacing between the two electrodes. This area is below the fibers and the liquid drop will be attracted to this area and collect in existing space between the fiber and the bottom of the groove as illustrated by drop 14''. When the voltage and thus the electrostatic field is removed, the liquid collected under the fibers is drawn into the coupling gap 13' as a result of capillary forces and to a slight degree also penetrates into the cavity 201''' which is disposed thereabove.

Since the electrostatic forces are generally small in comparison to the capillary forces, the adhesion must be reduced by means of surface treatment of the fiber end surface or a combination of two non-mixable liquids such as 14' and 14'' with different dielectric constants and different optical properties must be employed. In the switch 65, the liquid drop which is attracted out of the coupling gap 13' and collected under the gap by means of the applied electrostatic field is referenced by the drop 14''.

An embodiment of the switch of the present invention is generally indicated at 66 and illustrated in FIGS. 9a and 9b. In this embodiment, the liquid material is a magnetizable liquid and is moved by means of applying a magnetic force. This switch 66 is essentially constructed in exactly the same manner as the electrostatic on-off switch 62 of FIGS. 5a and 5b and the same reference numbers are utilized for the same structural parts or components. The switch 66, which is magnetically switched from one state or condition to another state or condition, differs from the electrostatically switched switches such as 62 only in that the electrodes such as 110 and 110' which are applied on the surfaces of the two blocks 10 and 20 are respectively designed as conductor loops with a diameter d and a current J can be sent therethrough. A flow of current J in the conductor loop generates an essentially axially directed magnetic field and the force per surface unit A exerted by this magnetic field on the magnetizable liquid is approximately given by a formula $F/A = \frac{1}{2}\mu_0\mu_r J^2 g/d^3$ wherein g again is the gap width or spacing, d is the diameter of the conductor loop $\mu_o$ is the absolute permeability and $\mu_r$ is the relative permeability.

Thus, if two drops such as 14g and 14h with one of them transmitting light and one being impermeable to light are disposed in a gap 13 and one of these two liquids is magnetizable, then a selective energizing of the electrodes 110 will cause a movement of the two drops in the plane of the gap 13 in one direction while an energizing of the electrodes 110' will cause a movement in the opposite direction. Thus, by selectively energizing one of the two groups of electrodes, the switch 66 can be shifted between an off and on state.

Figure 11A:
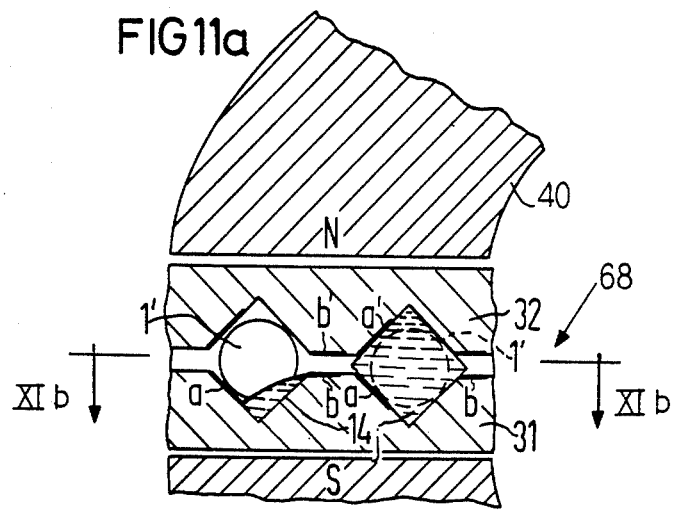
Figure 11B:
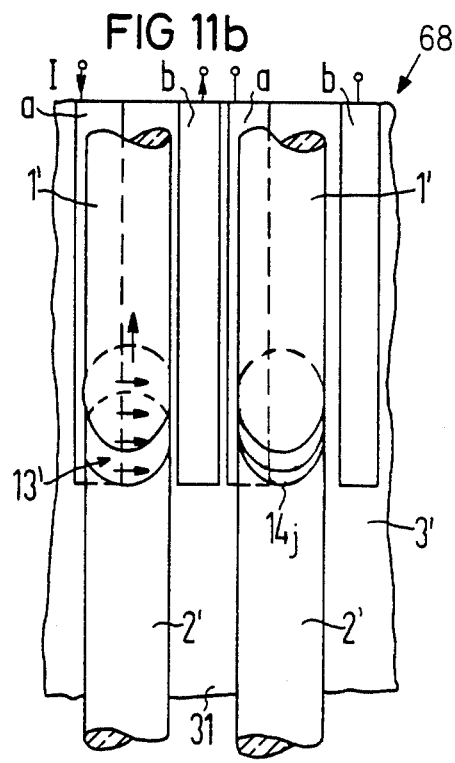
Figure 11C:
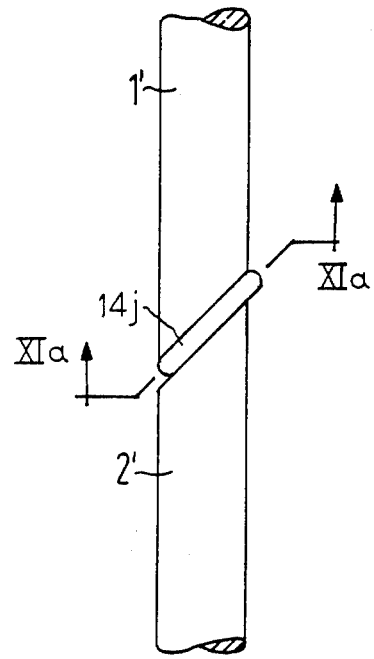

Other embodiments of switches utilizing magnetic forces are illustrated by the switch generally indicated at 67 in FIGS. 10a and 10b and the switch generally indicated at 68 in FIGS. 11a and 11b. In these two embodiments, a conductive liquid is deflected by means of a current flux in a magnetic field. When a current J flows through the liquid, for example, mercury, which is in a magnetic field with the field strength $\vec{H}$, a force $\vec{F}$ is exerted on the liquid column of the length l. The force $\vec{F}$ is according to the formula $\vec{F} = \mu_o \vec{Jl} \times \vec{B}$, wherein $\vec{l}$ is a vector directed in the direction in which the length of the liquid column is measured and the vector has a length l of the liquid column; B denotes the magnetic induction and $\vec{l}$ and $\vec{B}$ is the vector product of the two vectors.

The switch 67 includes a carrier body 31, which has a pair of parallel extending V-shaped grooves. Each of the grooves receives fibers 1 and 2 which form the waveguides and are disposed in the grooves with a gap 13 extending therebetween as illustrated in FIG. 10b. A cover body 32, which also has V-shaped grooves, is positioned on the fibers as illustrated in FIG. 10a.

The sides of the grooves of the carrier body 31 as well as the sides of the grooves of the carrier cover 32 are provided with strip-shaped electrodes to extend parallel to the fibers and are interrupted in the area of the coupling gap 13. Thus, each of the fibers 1 rest on a central electrode step b1 and has two lateral electrode strips a1 and c1, and each of the fibers 2 is on a strip b2 and has two lateral strips a2 and c2. The strips a2, b2 and c2 are aligned with the strips a1, b1 and c1. As illustrated in FIG. 10a, the cover 32 also has electrodes a1', b1' and c1' which corresponding to a1, b1, c1 and will also have three strips corresponding to a2, b2 and c2.

The entire structure of the carrier body 31, the cover 32 and the fiber pairs is introduced into a magnetic field which extends at right angles relative to the axis of the fibers and electrode strips and perpendicular relative to the plane in which the fibers are disposed. This can be achieved by the entire structure being introduced between opposite opposing poles of two permanent magnets or in a gap in a single annular permanent magnet 40 which has a south pole S and a north pole N.

A positive voltage U is applied to the lateral electrodes a1, a1' as well as c2. The lateral electrode strips a2, a2', c1, c1' and the center electrodes b2 and b2' are connected to ground. The voltage U can be selectively applied to the electrode strip b1 by utilizing a switch such as S2. This particular wiring arrangement is only an example of possible wiring arrangements.

When the switch S2 is closed, then a current flows in the electrode strip b1 through the electrically conducted drop 14j to the center electrode strip b2. Due to the magnetic field, the liquid of the drop 14j will be shifted toward the right until the lateral electrode strips c1 and c2 are short-circuited and thus an opposing force exerted on the drop 14j. When the switch S2 is opened, as in the case of the aligned fibers 1 and 2 on the right-hand side of FIG. 10b, the liquid drop 14j is not traversed by a current and thus likewise does not move from a position as illustrated with the right-hand fiber pair. If, however, the liquid drop were nonetheless to flow off laterally, then it will short-circuit the lateral electrode strips a1 to a2 or c1 to c2 and a force will be exerted which will force it back to the initial position. Thus, in operation the closing of the switch S2 will remove the drop 14j from a position engaging the end surfaces of the two aligned fibers 1 and 2.

In the embodiment of the switch 68 of FIGS. 11a and 11b, the carrier body 31, the cover body 32 and a permanent magnet 40 are also utilized. The aligned fibers 1' and 2', which are disposed in the V-shaped grooves, however, as in the embodiments of the switches 61, 63 and 65 are separated from one another by a coupling gap 13' which extends obliquely to the axis, for example, at an angle of 45°. In the switch 68, strip-shaped electrodes are also applied to the facing surfaces of the carrier 31 and the cover 32, however, it is also possible to only apply these to one of these two members or bodies. In contrast to the embodiment of the switch 67, only two strip-shaped electrodes extend parallel to the fiber and are provided per aligned fiber pair. The electrodes applied to the carrier body 31 are referenced with a and b, whereas the electrodes on the cover are a' and b'. The electrode a or, respectively, a', is applied to the lateral side surfaces forming the V-shaped grooves in the respective carrier body 31 and the cover 32 and do not extend over the entire transverse area of the particular fiber. The other strip-shaped electrodes such as b is disposed laterally next to the aligned pair of fibers. Both the electrodes a and b extend over the entire oblique gap 13' which is between the pair of aligned fibers. If electrodes a' and b' are applied on the cover 32, they also will extend over the gap 13'.

When the electrodes a and b as well as the electrodes a' and b' are short-circuited by a conductive liquid drop such as 14j in the gap 13 between the fibers 1' and 2', then when a voltage is applied between the electrodes a and b or a' and b', then a current flux at right angles to the fiber axis flows and as a consequence the liquid drop is displaced out of the coupling gap 13' toward either the top or bottom depending on which set of electrodes is energized. However, when no current is applied, the electrolyte or liquid 14j will assume the position illustrated in FIG. 1c and on the right-hand side of FIG. 11a to cause or to block the transmission of light between the fibers 1' and 2. A significant difference between the switch 67 and the switch 68 is that in the switch 67 the current flux occurs in a longitudinal direction of the fiber whereas in the case of the switch 68 it occurs at right angles to the fiber axis.

Tests were able to show that the boundary surface between the mercury and sufluric acid already shifts by approximately 2 mm in a glass capillary having an inside diameter of 0.1 mm when a voltage of 5 volts is applied. The shift could be tracked up to a frequency of approximately 1 kilohertz, even though a mercury column of approximately 100 mm long had to be moved.

In the following, embodiments of the switches are described in which the medium to be introduced into the beam path is altered volume-wise or amount-wise in a chemical manner or in which the optical properties of the liquid medium have been changed. On principle, an on-off switch can be constructed exactly like the switch 60 of FIG. 1 which has a movable liquid drop or level. However, in these switches the movable drop or level 14 is replaced by a suitable liquid medium, which is stationarily disposed in the coupling gap 13 between the fibers 1 and 2. A changeover switch will be constructed exactly the same as a changeover switch such as 61 of FIG. 3, however, the liquid level or drop 14 is replaced by a suitable liquid medium which is to be stationarily disposed in the coupling gap such as 13' between the fibers 1' and 2'.

Except for the disposition of the suitable liquid medium in the coupling gap, the manufacture of these on-off switches or, respectively, changeover switches, can occur in exactly the same manner as the switches already described. For example, they can be manufactured utilizing a planar technique by means of privileged etching in silicon. The coupling gap is also preferably again selected to be 10 μm through 100 μm wide. The manner of functioning of such an on-off switch or the changeover switch is the same as given for the switches such as on-off switch 60 or the changeover switch 61. Thus, in the "off" state or condition of the on-off switch, the liquid medium or material in the coupling gap will be either light impermeable or at least highly light-absorbent or scattering whereas in the "on" state, it will be light-transmissive as possible. When utilizing the changeover switches, the liquid medium must be as highly light-transmissive as possible and in the condition for coupling light between the two coaxial aligned waveguides must exhibit an index of refraction which approximately corresponds to the index of refraction of the two light coupling areas of the coaxial waveguides. However, when light is to be coupled into the branching-off waveguide, then a mirror surface must be created in the coupling gap which reflects a light supplied in one of the two coaxial waveguides in the direction of the branching waveguide.

A switch generally indicated at 69 in FIG. 12 is the first example of the above-mentioned on-off switches. In the switch 69, a pair of fibers 1 and 2 have stepped index profiles with the fiber 1 having a core 21 and a cladding or jacket 22 while the fiber 2 has a core 21' and a jacket 22'. The fibers 1 and 2 are arranged by support means (not illustrated) so that the end surface 11 of the fiber 1 and the end surface 12 of the fiber 2 form a gap 13. Electrode 121 is disposed on the surface 11 and electrode 122 is disposed on the surface 12. An electrolyte such as 140 is disposed in the gap 13 between these electrodes.

The two electrodes 121 and 122 are constructed with the electrode 122 being a transparent electrode which is disposed in the area of the core 21' of the fiber 2. The other electrode 121 is, for example, an annular electrode which surrounds the core 21 of the fiber 1. The electrodes are connected to a voltage source U and with a current passage through the electrolyte 140, the electrode 122 loses the original transparency as a result of a chemical reaction, which is already known and utilized in so-called electrochromic displays. The electrode 122 consists, for example, of transparent tungsten oxide which has an outer surface layer 114 converted to a deep blue tungstic acid ($H_nWO_3$, wherein n=1,2) during current passage. When the current is shut off, the tungstic acid layer 114 is maintained and only reconverts into transparent $WO_3$ when the current direction is reversed. Specific operation of the transparent electrode is known and, for example, discussed in articles by B. W. Faughnam et al, "Electrochromism in $WO_3$ Amorphous Films", *RCA Review*, Vol. 36, March 1975, pages 177-197 and H. J. Stocker et al, "Efficiency and Humidity Dependence on $WO_3$-Insulator Electrochromic Display Structures", *J. Applied Physics*, Vol. 50, No. 4, April 1979, pages 2993-2994.

Another embodiment of the switch is generally indicated at 70 in FIG. 13. In the switch 70, a pair of fibers 1 and 2, which are the same as the fibers of FIG. 12, are positioned by means (not illustrated) with end surfaces 11 and 12 forming a gap 13. A transparent electrode 123 was applied on the end surface 11 in the area of the core 21 of the fiber 1 while a transparent electrode 124 was applied on the surface 12 in the area of the core 21' of the fiber 2. These electrodes consist of, for example, SnO. A layer of liquid crystal material 141 which consists of a liquid which is embedded with a dichroitic colorant or dye is positioned in the gap 13 between the two electrodes. When a voltage source U does not apply any voltage to the electrodes 123 and 124, then the colorant or dye of the liquid crystal will absorb light. However, when a specific voltage is applied, the particles of the liquid crystal become erect in the electrical field so that the polarization direction of the light and of the colored molecules are perpendicular relative to one another. Such an operation in a liquid crystal display is well known and is discussed in the book *Applications of Liquid Crystals*, Springer Verlag, Berlin, Heidelberg, N.Y., pages 125-132.

The light in this condition is no longer absorbed and can traverse the liquid crystal layer 141 and thus be coupled from one fiber unto the other. When the colorant particles of the magnetic dipole moment are employed, then the alignment of the colorant molecules can also occur by means of a magnetic field and no electrodes would then be necessary in the core area of the fibers. It should also be noted that it is possible to select the particular dye and the liquid crystal material so that light will pass through the liquid crystal material when no voltage is applied but will be absorbed by the dye when a voltage is applied.

An embodiment of a changeover switch is generally indicated at 71 and illustrated in FIG. 14. In this embodiment, a fiber 1', which has a core 23 and a cladding or jacket 24, is axially aligned with a fiber 2', which has a core 23' and a jacket 24'. The means for axially aligning these two fibers is not illustrated but aligns the fibers so that their obliquely provided end faces 11' and 12' will form an obliquely extending gap 13' that extends at an angle approximately 45° to the axis of the coaxial fibers. A branching fiber 3', which has a core 33 and a cladding 34, is positioned with its end face adjacent the fiber 1'. As illustrated, the fiber 1' has a transparent electrode 122', which is disposed on the surface 11' in the area of the core 23. The other fiber 2' has an annular electrode 123' which surrounds the core 23'. An electrolyte 140' is disposed between the two electrodes. When a particular voltage is applied from the source U to the electrodes 122' and 123', a reflective layer 114', for example, a silver layer, will be precipitated out from the electrolyte 140' onto the electrode 122' so that light traveling along the fiber 1' will be reflected into the fiber 3'. By reversing the direction of the voltage, this layer 114' will be dissolved and the light will again pass through the electrolyte 140' and enter into the fiber 2'.

It should be noted that the switching-off operation can also occur by means of converting the electrode 122' from a transparent into a reflective electrode in a manner similar to that described with regard to the electrochromic electrode 122 of the switch 69 of FIG. 12.

Figure 15:
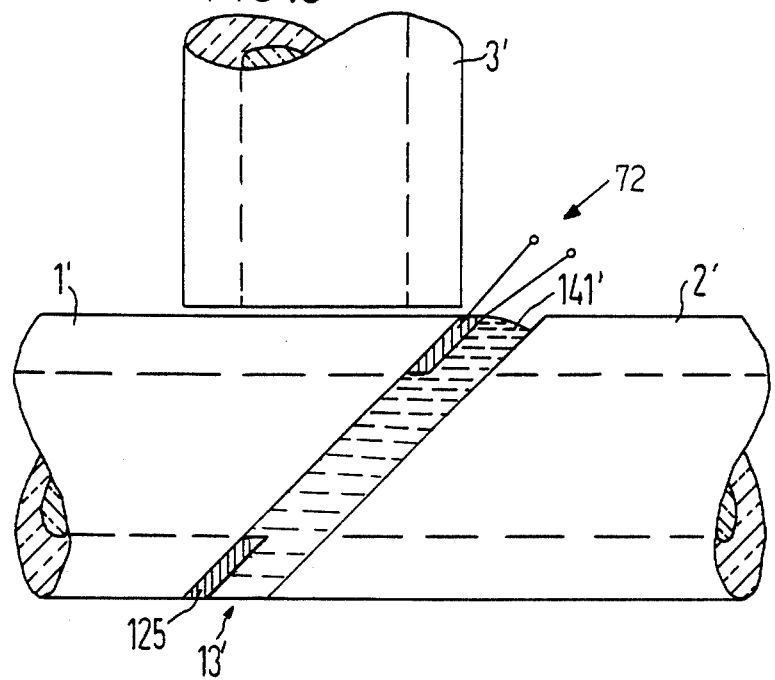
FIG. 15 is a cross-sectional view with portions in elevation of yet another embodiment of a changeover switch in accordance with the present invention.

Another embodiment of a changeover switch is generally indicated at 72 in FIG. 15. In this embodiment, the gap 13' between the end faces of fibers 1' and 2' is filled with a layer of material 141' which will selectively reflect light of a specific wavelength λ1. The material has a reflective effect with regard to the wavelength λ1 which is varied due to changes in temperatures or by the application of electrical voltage. Examples of this material are liquid crystals of the cholesterin base, which are discussed in the above-mentioned book *Applications of Liquid Crystals* and also in an article by J. R. Hansen et al, "Liquid Crystal Media for Electron Beam Recording", *IEEE Transactions on Electron Devices*, Vol. ED-15, No. 11, November 1968, pages 896-906.

Figure 16:
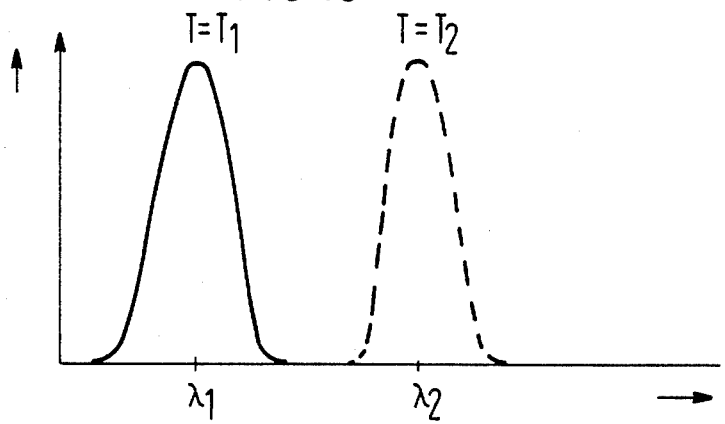
FIG. 16 is a graph of a reflection curve of a liquid crystal material utilized in the device of FIG. 15 showing the amount of reflection for different wavelengths in response to different temperatures.

An example of such a liquid crystal will have different reflective properties for different wavelengths at different temperatures. It is graphically illustrated in FIG. 16 that at a temperature T=T1, the light wavelength λ1 is reflected into the fiber 3'. When the temperature is increased from the temperature T1, the liquid crystal material becomes transparent to the wavelength λ1 and the light of this wavelength will then be switched into the fiber 2'. As illustrated in FIG. 16, at a temperature T2, the liquid crystal will reflect a wavelength λ2 while still being transparent to the wavelength λ1. While the change in the temperature of the layer 141' can be due to changes in the ambient temperature, the switch 72 includes an annularly designed heating resistor 125, which is similar to those used in a thermal printer, to elevate the temperature of the liquid crystal layer 141'. Given wavelength division multiplex operations, a light with different wavelengths can be selectively coupled out of and coupled into the various waveguides.

The change of the center frequency of the reflection band width can also be in response to an application of electrical voltage as discussed in the article by Hansen et al. The center frequency without an applied voltage can be obtained by using different mixing ratios of the different cholesterin components. The tuning voltage lies between 0.5 volt/nm and 1 volt/nm. An experimentally achieved switching frequency is at a few hundred kHz.

Switches according to the above-described principles can be employed in a line-shaped disposition for fiber optical displays or for "writing" the charge images on semiconductor drums in a laser printer. The embodiment of the switches 60 and 61 with a liquid crystal of the cholesterin base disposed in the gap can be employed as a cheap temperature sensor for an alarm and control purposes. When the threshold temperature T1 is exceeded, light of the wavelength λ1 is no longer allowed to pass and this can be measured at the end of the fiber path with a detector.

Although various minor modifications may be suggested by those versed in the art, it should be understood that we wish to embody within the scope of the patent granted hereon, all such modifications as reasonably and properly come within the scope of our contribution to the art.

We claim:

1. An optical device for controlling radiation conducted in an optical waveguide, said device comprising an optical waveguide having an end surface and means for controlling the entrance and exit of a beam of radiation from said end surface of the optical waveguide, said means including a liquid medium being disposed adjacent said end surface, said medium consisting of a specific amount of a free-flowing liquid material having a surface tension, said means including means for moving the free-flowing liquid into and out of the beam path, and said means for moving said liquid including means for changing the surface tension.

2. An optical device according to claim 1, which includes a second optical waveguide having an end surface spaced from the end surface of the first-mentioned waveguide to form a gap for receiving the medium.

3. An optical device according to claim 1, wherein said means for changing the surface tension includes means for application of electrical voltage to the liquid.

4. An optical device according to claim 3, which includes a second optical waveguide having an end surface spaced from the end surface of the first-mentioned waveguide to form a gap for receiving the medium.

5. An optical device for controlling radiation conducted in an optical waveguide, said device comprising an optical waveguide having an end surface and means for controlling the entrance and exit of a beam of radiation from said end surface of the optical waveguide, said means including a liquid medium being disposed in the beam path adjacent said end surface, said medium being changeable between a light-transmissive state and a light-blocking state and comprising an electrolyte material electrochemically precipitating out a layer and redissolving said layer in response to an application of an electrical field, said means for controlling including means for changing the state of said medium by applying electrical fields to create and remove a precipitate layer.

6. An optical device for controlling radiation conducted in an optical waveguide, said device comprising an optical waveguide having an end surface and means for controlling the entrance and exit of a beam of radiation from said end surface of the optical waveguide, said means including a liquid medium being disposed in the beam path adjacent said end surface, said medium being changeable between a light-transmissive state and a light-blocking state and comprising and electrochromic material producing a layer of precipitate in response to an electrical field, said means for controlling including means for changing the state of said medium by selectively applying the electrical fields to produce said layer and to dissolve said layer.

7. An optical switch comprising at least a first and second optical waveguide having end surfaces, means supporting said waveguides in alignment with a gap between said end surface and means disposed at said gap for controlling transmission of light between said end surfaces, said means for controlling including a dielectric free-flowing liquid being disposed in said gap and a plurality of electrodes adjacent said gap for generating electrostatic fields to control the position of said free-flowing liquid.

8. An optical switch according to claim 7, wherein said electrodes are disposed in said gap in such manner to generate essentially homogeneously electrostatic fields.

9. An optical switch according to claim 8, wherein the electrodes are planar electrodes applied to both sides of the gap to lie opposite one another and to form at least two separate electrode pairs, said electrode pairs being provided on opposite sides of the designed waveguide whereby selective energizing of said electrode pairs generates an electrostatic field in the area of one of said electrode pairs to position said dielectric free-flowing liquid.

10. An optical switch according to claim 7, wherein said electrodes are disposed and designed in such a manner that an inhomogeneous electrostatic field is generated, said dielectric free-flowing liquid being attracted to said area of highest field strength of said field.

11. An optical switch according to claim 10, wherein said electrodes are planar electrodes disposed on at least one of the opposite sides of the gap, the voltage between said electrodes being applied with at least two of the said electrodes being shaped so that the distance between the two electrodes changes to provide a pair of closely spaced points on said electrodes to concentrate said field therebetween.

12. An optical switch according to claim 10, wherein said optical waveguides are optical fibers, said means for optically aligning said first and second waveguides comprises a groove receiving said fibers, said electrodes being disposed on a surface of said groove and having a shape with the smallest spacing therebetween being positioned in an area of the gap so that when a voltage is applied to said electrodes, an area of greatest field strength occurs to draw the free-flowing liquid from said gap, and said free-flowing liquid being held in the gap due to capillary forces in the absence of an electrical field.

13. An optical switch comprising at least a first and second optical waveguide having end surfaces, means supporting said waveguides in alignment with a gap between said end surface and means disposed at said gap for controlling transmission of light between said end surfaces, said means for controlling including a magnetizable liquid medium and electrodes constructed as conductor loops being disposed in said gap, said electrodes generating an essentially axially directed magnetic field when in a current permeated condition, said magnetizable liquid medium being movable to said axial magnetic field during one state of operation of said means for controlling.

14. An optical switch comprising at least a first and second optical waveguide having end surfaces, means supporting said waveguides in alignment with a gap between said end surface and means disposed at said gap for controlling transmission of light between said end surfaces, and means for creating a magnetic field extending at right angles relative to the aligned waveguides at said gap, said means for controlling including a free-flowing liquid material being disposed in said gap and movable from one position allowing light transmission between said waveguides to a second position blocking transmission, said means for controlling including a plurality of strip electrodes extending parallel to said waveguides, and means for electrically contacting selected electrodes with selected voltages so that said free-flowing liquid material short-circuits said electrodes and by so doing, generates a force moving the material to one of said positions in response to the magnetic field.

15. An optical switch according to claim 14, wherein the parallel extending electrodes extend along each of said waveguides with the electrodes of one waveguide being aligned with the electrodes of the other waveguide and separated by said gap, said material short-circuiting aligned electrodes separated by said gap.

16. A switch according to claim 14, wherein all the electrodes are disposed parallel to one of said waveguides on one side of said gap, said liquid material short-circuiting adjacent electrodes to create said force in the material to move said material to one of said positions.

17. An optical switch comprising at least a first and second optical waveguide having end surfaces, means supporting said waveguides in alignment with a gap between said end surface and means disposed at said gap for controlling transmission of light between said end surfaces, said means for controlling including a liquid material and electrode pairs being disposed in particular areas of the end surfaces of the aligned waveguides, said electrodes being connected to means for applying a voltage therebetween, said liquid material being an electrolyte precipitating a light-blocking layer on one of said electrodes in response to a current applied to said electrodes, and wherein the removal of said current causes a dissolving of said layer back into said electrolyte.

18. An optical switch according to claim 17, wherein said electrolyte precipitates a metal layer in response to an application of voltage to create a light-reflecting layer on said one electrode.

19. An optical switch according to claim 17, wherein said liquid material is an electrochromic electrolyte wherein an application of a current on said electrodes causes a color layer to be formed thereon and a reverse of the direction of the current causes dissolving of the layer.

* * * * *